(12) United States Patent
Jeon et al.

(10) Patent No.: US 10,321,120 B2
(45) Date of Patent: Jun. 11, 2019

(54) DISPLAY APPARATUS WITH ELECTROCHROMIC MIRROR

(71) Applicant: SAMSUNG ELECTRONICS CO., LTD., Suwon-si (KR)

(72) Inventors: Keun-bae Jeon, Suwon-si (KR); Won Yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 14/855,473

(22) Filed: Sep. 16, 2015

(65) Prior Publication Data
US 2016/0127719 A1    May 5, 2016

(30) Foreign Application Priority Data
Oct. 30, 2014   (KR) .................. 10-2014-0149426

(51) Int. Cl.
| | | |
|---|---|---|
| *H04N 13/31* | (2018.01) | |
| *G02B 27/22* | (2018.01) | |
| *G02F 1/15* | (2019.01) | |

(52) U.S. Cl.
CPC ......... *H04N 13/31* (2018.05); *G02B 27/2214* (2013.01); *G02F 1/15* (2013.01); *G02F 2201/44* (2013.01)

(58) Field of Classification Search
None
See application file for complete search history.

(56) References Cited

U.S. PATENT DOCUMENTS

| | | | | |
|---|---|---|---|---|
| 2006/0087499 | A1* | 4/2006 | Chen ............. | H04N 13/0454 345/204 |
| 2007/0165305 | A1* | 7/2007 | Mehrle ........... | G02B 27/2214 359/464 |
| 2009/0213147 | A1* | 8/2009 | Sagardoyburu .... | G02B 27/0093 345/690 |
| 2010/0253767 | A1* | 10/2010 | Wang ............. | H04N 13/0409 348/51 |
| 2010/0277786 | A1* | 11/2010 | Anderson ......... | B60R 1/088 359/247 |
| 2011/0304530 | A1* | 12/2011 | Yeh .............. | G02B 27/2264 345/156 |
| 2012/0120476 | A1* | 5/2012 | Yeh .............. | G02B 27/22 359/270 |
| 2012/0154891 | A1* | 6/2012 | Yeh .............. | G02F 1/153 359/265 |

(Continued)

FOREIGN PATENT DOCUMENTS

| | | |
|---|---|---|
| JP | 2009-53391 A | 3/2009 |
| JP | 2009217259 A | 9/2009 |

OTHER PUBLICATIONS

Communication dated Dec. 21, 2016, issued by the European Patent Office in counterpart European Application No. 15186302.4.

(Continued)

*Primary Examiner* — Kent W Chang
*Assistant Examiner* — Nathaniel P Brittingham
(74) *Attorney, Agent, or Firm* — Sughrue Mion, PLLC

(57) ABSTRACT

A three-dimensional (3D) display apparatus including: a display panel; a backlight configured to supply light to the display panel; and a parallax barrier disposed between the display panel and the backlight, wherein the parallax barrier includes an electrochromic mirror (ECM).

15 Claims, 5 Drawing Sheets

(56) References Cited

U.S. PATENT DOCUMENTS

| | | | |
|---|---|---|---|
| 2013/0083260 A1* | 4/2013 | Minami | F21S 8/00 349/15 |
| 2014/0036339 A1* | 2/2014 | Tonar | B32B 27/06 359/267 |
| 2014/0078045 A1 | 3/2014 | Yang et al. | |
| 2015/0131138 A1 | 5/2015 | Cho et al. | |
| 2015/0160525 A1* | 6/2015 | Shi | G02F 1/155 359/275 |
| 2015/0269893 A1* | 9/2015 | Wu | G02B 27/2214 345/419 |
| 2015/0319427 A1* | 11/2015 | Wu | H04N 13/0409 345/426 |
| 2016/0005375 A1* | 1/2016 | Naijo | G09G 3/38 345/690 |
| 2016/0127719 A1* | 5/2016 | Jeon | H04N 13/0409 348/54 |

OTHER PUBLICATIONS

Communication from the European Patent Office dated Jan. 7, 2016 in a counterpart European Application No. 15186302.4.

* cited by examiner

DISPLAY APPARATUS WITH ELECTROCHROMIC MIRROR

CROSS-REFERENCE TO RELATED APPLICATION

This application claims priority from Korean Patent Application No. 10-2014-0149426, filed on Oct. 30, 2014 in the Korean Intellectual Property Office, the disclosure of which is incorporated herein by reference in its entirety.

BACKGROUND

1. Field

Aspects of one or more exemplary embodiments relate to a display apparatus having an electrochromic mirror. The display apparatus may be a two-dimensional (2D) display apparatus or a three-dimensional (3D) display apparatus that is capable of displaying a 3D image in a glassesless manner.

2. Description of the Related Art

In general, display apparatuses, which are apparatuses for displaying images, include monitors, televisions (TVs), smartphones, personal digital assistants, and the like.

Three-dimensional (3D) display apparatuses are capable of displaying two-dimensional (2D) images and 3D images have recently been proposed.

A 3D display apparatus includes a display panel, such as a liquid crystal panel, a backlight disposed behind the display panel that supplies light to the display panel, and a parallax barrier disposed between the display panel and the backlight that causes the light supplied by the backlight to selectively pass through the 3D display apparatus according to a portion of the 3D display apparatus so that screens having different parallax may be output.

The parallax barrier includes blocking portions that prevent the light supplied by the backlight from being transferred to the display panel and transmitting portions disposed alternately with the blocking portions that cause the light supplied by the backlight to pass through the parallax barrier and to be transferred to the display panel.

SUMMARY

An aspect of one or more exemplary embodiments is to provide a three-dimensional (3D) display apparatus with improved brightness.

Additional aspects of one or more exemplary embodiments will be set forth in part in the description which follows and, in part, will be obvious from the description, or may be learned by practice of one or more exemplary embodiments.

In accordance with one aspect of an exemplary embodiment, there is provided a three-dimensional (3D) display apparatus including: a display panel; a backlight configured to supply light to the display panel; and a parallax barrier disposed between the display panel and the backlight, wherein the parallax barrier includes an electrochromic mirror (ECM).

The ECM may include blocking portions configured to block light and transmitting portions configured to transmit light, and the blocking portions and the transmitting portions may be alternately formed in the ECM.

Positions of the blocking portions and positions of the transmitting portions may be adjustable based on a position of a viewer.

The backlight may include: a light guide panel configured to guide the supplied light toward the display panel; a pair of 3D light sources disposed on opposite ends of the light guide panel; and a two-dimensional light source disposed behind the light guide panel.

The pair of 3D light sources and the two-dimensional light source may include respective substrates and respective pluralities of light emitting diodes disposed on the respective substrates.

The display panel may include a liquid crystal panel.

In accordance with another aspect of an exemplary embodiment, there is provided a display apparatus including: a display panel; a backlight configured to supply light to the display panel; and an electrochromic mirror (ECM) disposed between the display panel and the backlight.

The ECM may include blocking portions configured to block the light supplied by the backlight and transmitting portions configured to transmit the light supplied by the backlight, and the blocking portions and the transmitting portions are alternately formed in the ECM.

The backlight may include: a light guide panel configured to guide the supplied light toward the display panel; a pair of 3D light sources disposed on opposite side ends of the light guide panel; and a two-dimensional light source disposed behind the light guide panel.

A reflectivity of the ECM may be adjustable based on electricity applied to the ECM.

The reflectivity of the ECM may be adjustable based on electricity applied to the ECM to provide one or more blocking portions and one or more transmitting portions.

The display apparatus may be configured to control a size and position of the one or more blocking portions and the one or more transmitting portions.

The display apparatus may be further configured to, in response to a portion of the display panel displaying a dark portion of a screen, control an area of the ECM corresponding to the portion of the display panel to be a blocking portion.

The display apparatus may be further configured to control the ECM to form a parallax barrier with the one or more blocking portions and the one or more transmitting portions.

The display apparatus may be further configured to control the ECM to form the parallax barrier by forming the one or more blocking portions and the one or more transmitting portions in alternating strips.

The display apparatus may be further configured to control the ECM to adjust the parallax barrier based on a position of a viewer of the display apparatus relative to a front of the display panel.

The display apparatus may be further configured to control the ECM to adjust the parallax barrier based on a distance of a viewer of the display apparatus from the display panel.

BRIEF DESCRIPTION OF THE DRAWINGS

These and/or other aspects of one or more exemplary embodiments will become apparent and more readily appreciated from the following description of certain exemplary embodiments, taken in conjunction with the accompanying drawings of which.

DETAILED DESCRIPTION

Figure 1:
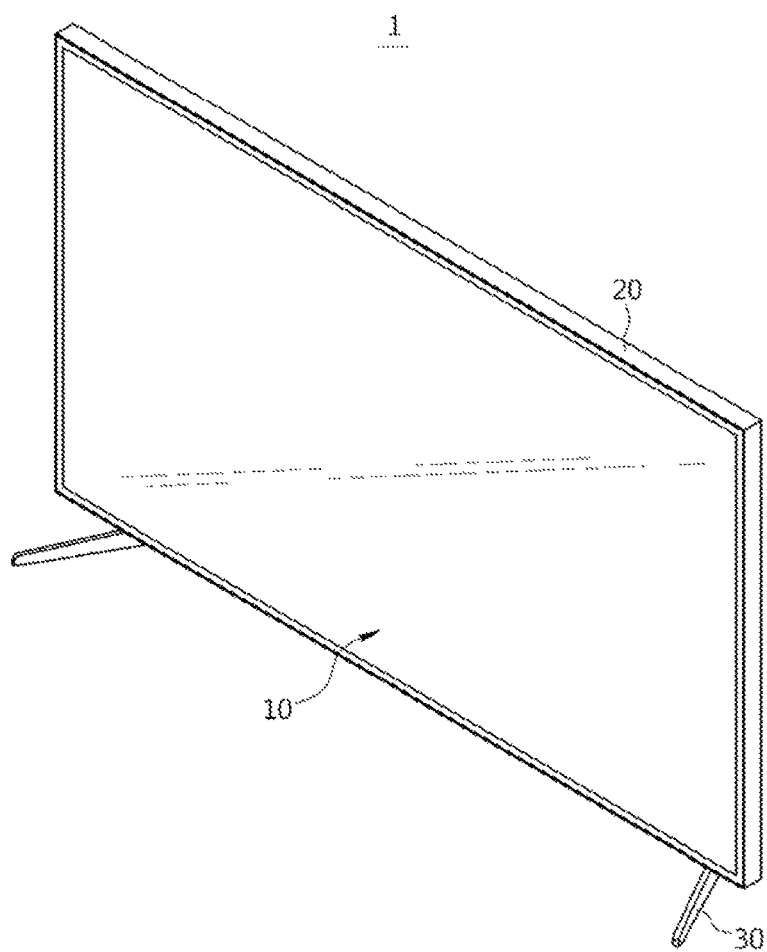
FIG. 1 is a perspective view of a three-dimensional (3D) display apparatus according to an exemplary embodiment.

The certain exemplary embodiments and configurations described in the specification and shown in the drawings are merely non-limiting examples, and various modifications may be made thereto without departing from the principles and spirit of the present disclosure.

Hereinafter, a three-dimensional (3D) display apparatus according to an exemplary embodiment will be described in detail with reference to the accompanying drawings.

As illustrated in FIG. 1, a 3D display apparatus 1 includes a display 10, i.e., a display module, for displaying a screen and a case 20 that accommodates the display 10 and forms an exterior of the 3D display apparatus 1. A stand 30 is connected to a rear side of the case 20 so that the 3D display apparatus 1 can be installed in a standing state on a horizontal plane.

Figure 2:
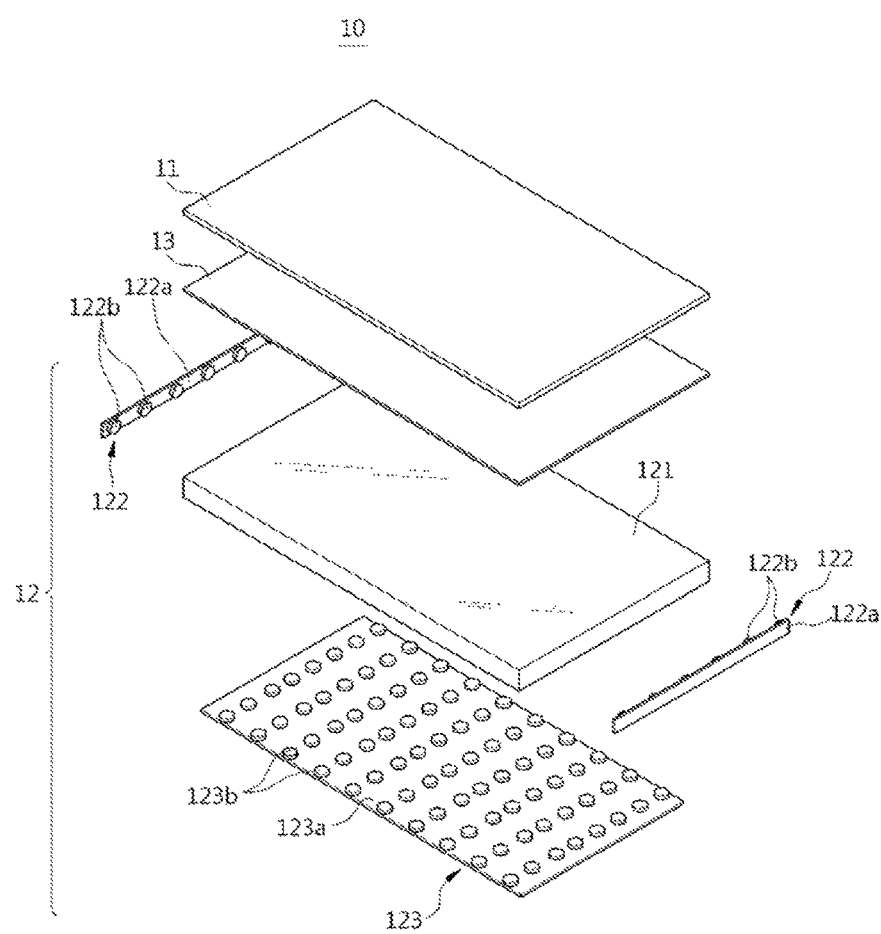
FIG. 2 is an exploded perspective view of a display of a 3D display apparatus according to an exemplary embodiment.
Figure 3:
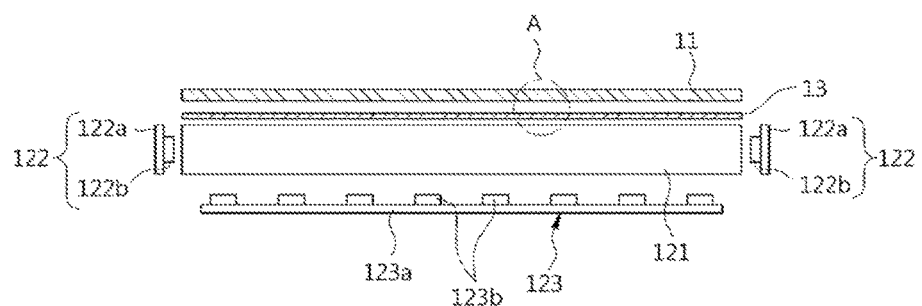
FIG. 3 is a cross-sectional view of a display of a 3D display apparatus according to an exemplary embodiment.

As illustrated in FIGS. 2 and 3, the display 10 includes a display panel 11 on which an image is displayed, a backlight 12, i.e., a backlight unit, that generates light and supplies the light to the display panel 11, and a parallax barrier 13 that is disposed between the display panel 11 and the backlight 12, and causes the light supplied by the backlight 12 to be selectively emitted toward the display panel 11 according to a portion of the display 10 so that the 3D display apparatus 1 can display a 3D image.

The display panel 11 is formed as a liquid crystal panel having, for example, a shape of a rectangular flat panel.

The backlight 12 includes light sources 122 and 123 that generate light and a light guide panel 121 that guides the generated light toward the display panel 11.

The light guide panel 121 is formed of a transparent material, and is disposed behind the display panel 11. The light guide panel 121 has, for example, a shape of a rectangular flat panel corresponding to the display panel 11.

The light sources 122 and 123 include 3D light sources 122 used when the 3D display apparatus 1 displays a 3D image and a two-dimensional light source 123 used when the 3D display apparatus 1 displays a two-dimensional image.

The 3D light sources 122 and the two-dimensional light source 123 include substrates 122a and 123a and a plurality of light emitting diodes 122b and 123b disposed on the substrates 122a and 123a, respectively. The substrate 122a of each of the 3D light sources 122 is disposed to be parallel to a side end of the light guide panel 121, and the light emitting diodes 122b of each of the 3D light sources 122 are disposed to face the side end of the light guide panel 121 and radiate light toward the side end of the light guide panel 121. The light emitting diodes 122b are disposed to be spaced apart from each other in a lengthwise direction of the substrate 122a, as illustrated in FIGS. 2 and 3. Two 3D light sources 122 are disposed on opposite sides of the light guide panel 121 so that light can be incident on the light guide panel 121 through opposite side ends of the light guide panel 121.

The substrate 123a of the two-dimensional light source 123 is formed having, for example, a shape of a rectangular flat panel and is disposed behind the light guide panel 121, parallel with the light guide panel 121. The light emitting diodes 123b of the two-dimensional light source 123 are disposed on a front surface of the substrate 123a facing a rear side of the light guide panel 121 in order to radiate light toward the rear side of the light guide panel 121.

Thus, the light generated by the 3D light sources 122 is incident on the light guide panel 121 through opposite side ends of the light guide panel 121 and then is emitted toward the front display panel 11. The light generated by the two-dimensional light source 123 is incident through the rear side of the light guide panel 121 and then passes through the light guide panel 121 with no change, and is emitted toward the front display panel 111.

The parallax barrier 13 is formed having, for example, a shape of a rectangular flat panel to correspond to the display panel 11. When the display 10 displays a 3D screen, the parallax barrier 13 causes the light supplied by the backlight 12 to selectively pass through the display 10 according to a portion of the display 10 so that screens having different parallax may be output, and a user may experience a 3D effect.

Figure 4:
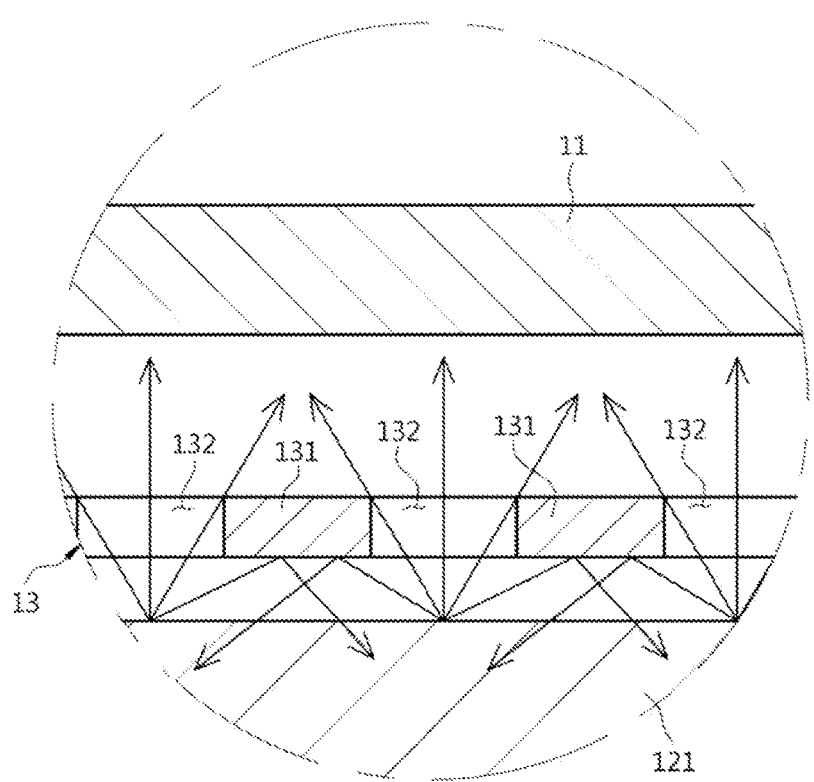
FIGS. 4 and 5 are enlarged views of portion A of FIG. 3.

To this end, the parallax barrier 13 includes blocking portions 131 that block light supplied by the backlight 12, and transmitting portions 132 that transmit the light supplied by the backlight 12 to be transferred to the display panel 11, as illustrated in FIG. 4. The blocking portions 131 and the transmitting portions 132 are disposed alternately with each other so that screens having different parallax may be output. The blocking portions 131 and the transmitting portions 132 may be formed in alternating strips.

The parallax barrier 13 includes an electrochromic mirror (ECM). The ECM includes an electrochromic material, a reflectivity of which is changed as electricity is applied to the ECM. Electricity may be applied or not applied to the ECM to a portion of the ECM so that the blocking portions 131 and the transmitting portions 132 are formed.

The display apparatus may include a processor or a controller that controls a size and location of the blocking portions 131 and the transmitting portions 132 of the ECM. The processor or controller can control the application of electricity to the ECM to control the size and location of the blocking portions 131 and the transmitting portions 132.

As described above, when the parallax barrier 13 is formed as the ECM, the blocking portions 131 of the parallax barrier 13 reflect and block the light. As such, the light reflected by the blocking portions 131 is incident on the light guide panel 121 of the backlight 12 and then is transferred to the parallax barrier 13. Thus, a greater portion of the light generated in the 3D light sources 122 may be transferred to the display panel 11 such that a brightness of the 3D display apparatus 1 can be improved through the parallax barrier 13 formed as the ECM.

Figure 5:
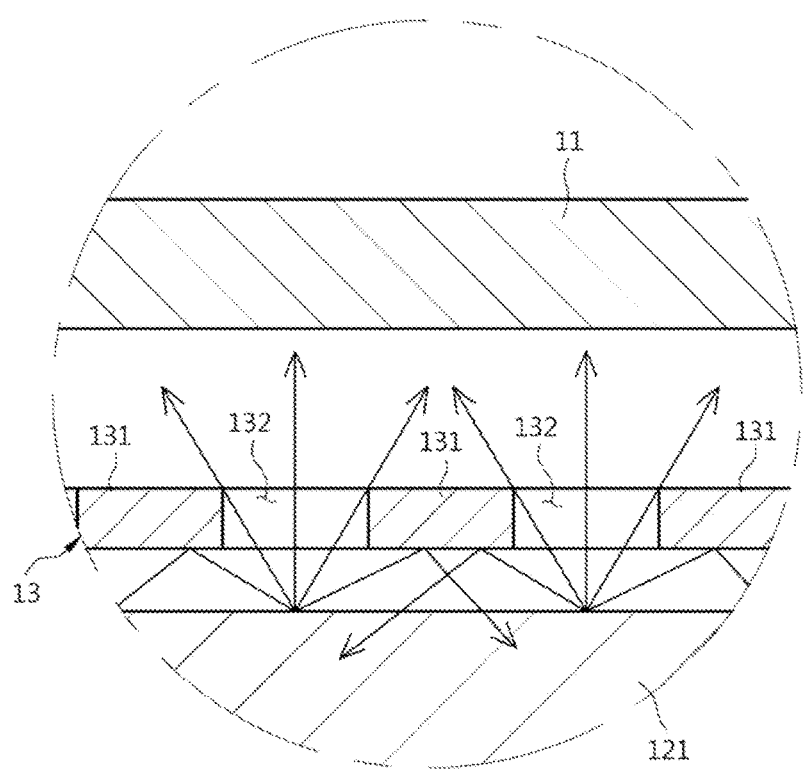

In the parallax barrier 13 formed as an ECM, positions of the blocking portions 131 and the transmitting portions 132 are adjustable, as illustrated in FIG. 5. Thus, the 3D display apparatus 1 can adjust with respect to a distance between the user and the 3D display apparatus 1 or the user's position or angle relative to the display panel 11.

Also, in the parallax barrier 13 formed as an ECM, all portions of the parallax barrier 13 may be changed into the transmitting portions 132 when the display 10 displays a two-dimensional screen. In this configuration, the light generated in the two-dimensional light source 123 may pass through the parallax barrier 13 without being changed, and may be transferred to the display panel 11. Thus, even when the 3D display apparatus 1 displays the two-dimensional screen, brightness of the displayed screen can be improved.

Also, in the parallax barrier 13 formed as an ECM, when dark or black portions are displayed on a screen of the 3D display apparatus 1, all areas corresponding to the dark portions may be changed into the blocking portions 131 so that light can be prevented from being transferred to the display panel 11 at the dark portions. Thus, representation of the dark portions of the screen of the 3D display apparatus 1 can be improved.

Exemplary embodiments have been described above as a 3D display apparatus. However, one or more exemplary embodiments are not limited thereto, and certain exemplary embodiments may be applied to a display apparatus that is capable of displaying only a two-dimensional image so that, as described above, representation of the dark portions of a screen of the display apparatus can be improved.

As described above, a parallax barrier is formed as an electrochromic mirror (ECM) so that light incident on blocking portions of the parallax barrier is reflected from a backlight and then is supplied to the parallax barrier. Thus, brightness of a 3D display apparatus can be improved using the same light sources.

Although a few exemplary embodiments have been shown and described, it would be appreciated by those skilled in the art that changes may be made to these exemplary embodiments without departing from the principles and spirit of the invention, the scope of which is defined in the claims and their equivalents.

What is claimed is:

1. A three-dimensional (3D) display apparatus comprising:
   a display panel;
   a backlight configured to supply light to the display panel;
   a parallax barrier including an electrochromic mirror (ECM) and disposed between the display panel and the backlight; and
   a controller configured to control the ECM,
   wherein the ECM comprises one or more blocking portions configured to block light and one or more transmitting portions configured to transmit light,
   wherein a size and a position of the one or more blocking portions and the one or more transmitting portions, respectively, are adjusted based on electricity applied to the ECM, and
   wherein the controller is configured to, in response to a portion of the display panel displaying a dark portion of a screen, control the ECM to set an area of the ECM corresponding to the portion of the display panel as a blocking portion.

2. The 3D display apparatus of claim 1, wherein the blocking portions and the transmitting portions are alternately formed in the ECM.

3. The 3D display apparatus of claim 2, wherein the controller is further configured to adjust positions of the blocking portions and positions of the transmitting portions based on a position of a viewer.

4. The 3D display apparatus of claim 1, wherein the backlight comprises:
   a light guide panel configured to guide the supplied light toward the display panel;
   a pair of 3D light sources disposed on opposite ends of the light guide panel; and
   a two-dimensional light source disposed behind the light guide panel.

5. The 3D display apparatus of claim 4, wherein the pair of 3D light sources and the two-dimensional light source comprise respective substrates and respective pluralities of light emitting diodes disposed on the respective substrates.

6. The 3D display apparatus of claim 1, wherein the display panel comprises a liquid crystal panel.

7. A display apparatus comprising:
   a display panel;
   a backlight configured to supply light to the display panel;
   an electrochromic mirror (ECM) disposed between the display panel and the backlight; and
   a controller configured to control the ECM,
   wherein the ECM comprises one or more blocking portions configured to block light and one or more transmitting portions configured to transmit light,
   wherein a size and a position of the one or more blocking portions and the one or more transmitting portions, respectively, are adjusted based on electricity applied to the ECM, and
   wherein the controller is configured to, in response to a portion of the display panel displaying a dark portion of a screen, control the ECM to set an area of the ECM corresponding to the portion of the display panel as a blocking portion.

8. The display apparatus of claim 7, wherein the blocking portions and the transmitting portions are alternately formed in the ECM.

9. The display apparatus of claim 8, wherein the backlight comprises:
   a light guide panel configured to guide the supplied light toward the display panel;
   a pair of 3D light sources disposed on opposite side ends of the light guide panel; and
   a two-dimensional light source disposed behind the light guide panel.

10. The display apparatus of claim 7, wherein a reflectivity of the ECM is adjustable based on the electricity applied to the ECM.

11. The display apparatus of claim 10, wherein the reflectivity of the ECM is adjustable based on the electricity applied to the ECM to provide the one or more blocking portions and the one or more transmitting portions.

12. The display apparatus of claim 11, wherein the controller is further configured to control the ECM to form a parallax barrier with the one or more blocking portions and the one or more transmitting portions.

13. The display apparatus of claim 12, wherein the controller is further configured to control the ECM to form the parallax barrier by forming the one or more blocking portions and the one or more transmitting portions in alternating strips.

14. The display apparatus of claim 12, wherein the controller is further configured to control the ECM to adjust the parallax barrier based on a position of a viewer of the display apparatus relative to a front of the display panel.

15. The display apparatus of claim 12, wherein the controller is further configured to control the ECM to adjust the parallax barrier based on a distance of a viewer of the display apparatus from the display panel.

* * * * *